United States Patent
Delumeau et al.

[11] Patent Number: 6,028,927
[45] Date of Patent: Feb. 22, 2000

[54] METHOD AND DEVICE FOR DETECTING THE PRESENCE OF A PERIODIC SIGNAL OF KNOWN PERIOD

[75] Inventors: François Delumeau, Rennes; Philippe Piret, Cesson-Sevigne, both of France

[73] Assignee: Canon Research Centre-France S.A., Cesson Sevigne Cedex, France

[21] Appl. No.: 08/773,135

[22] Filed: Dec. 26, 1996

[30] Foreign Application Priority Data

Dec. 26, 1995 [FR] France .................................. 95 15479

[51] Int. Cl.[7] .................................................. H04M 9/08
[52] U.S. Cl. ........................ 379/386; 379/93.09; 379/350
[58] Field of Search .................................. 379/282, 350, 379/351, 352, 353, 372, 386, 88, 89, 93.28, 93.09, 88.17, 88.18, 88.22

[56] References Cited

U.S. PATENT DOCUMENTS

| | | | |
|---|---|---|---|
| 4,312,074 | 1/1982 | Pautler et al. | 375/96 |
| 4,490,831 | 12/1984 | Poston et al. | 375/94 |
| 5,185,783 | 2/1993 | Takahashi et al. | 379/93 |
| 5,343,420 | 8/1994 | Marata et al. | 364/825 |
| 5,390,244 | 2/1995 | Hinman et al. | 379/386 |

FOREIGN PATENT DOCUMENTS

| | | |
|---|---|---|
| 515685 A1 | 12/1992 | European Pat. Off. . |
| 595483 A1 | 5/1994 | European Pat. Off. . |

*Primary Examiner*—Scott Weaver
*Attorney, Agent, or Firm*—Fitzpatrick, Cella, Harper & Scinto

[57] ABSTRACT

The present invention proposes a method and a device for detecting, amongst a set of signals, the presence of a periodic signal of period of occurrence T, in which a signal discriminating the said signal in the said set of signals is delivered. According to the invention, the discrimination signal is sampled in ln samples over more than one period T, a state value B(i) representing its level, and a true correlation value SR is calculated, by cumulating, for pairs of samples i and i+Z, the instantaneous value of correlation between the state value B(i) and the state value B(i+Z), the samples i and i+Z being located at instants shifted by a period T. Then, for said pairs od samples having the said signal over the total number of samples is measured, at least one so-called "theoretical correlation average" value is determined, and the true correlation value SR is compared with each theoretical correlation average value and from this the presence or absence of the signal to be detected is deduced.

43 Claims, 9 Drawing Sheets

Prior art

METHOD AND DEVICE FOR DETECTING THE PRESENCE OF A PERIODIC SIGNAL OF KNOWN PERIOD

FIELD OF THE INVENTION

The present invention concerns a method and a device for detecting the presence of a signal amongst a set of signals. More particularly, the present invention concerns the detection of a periodic signal during at least a first predetermined duration $T_{ON}$.

BACKGROUND OF THE INVENTION

FIG. 1 illustrates an example signal capable of being detected by the method and the device according to the invention. It is the well known signal corresponding to the "busy tone" transmitted by the telephone network in the following cases:

a called party is already in the process of communication, a party, whether called or calling, releases the line in the process of communication.

This signal, which in France is defined by the standard PAA/1108, paragraph 6.6., is formed by the amplitude modulation of a carrier (of 440 Hz nominal value capable of varying between 406 Hz and 474 Hz) by an envelope 1a. This envelope appears in the form of a periodic square wave determining a periodic sending duration $T_{ON}$ of the carrier (0.5 sec) and a periodic "silence" duration $T_{OFF}$ (0.5 sec), the period T of the square wave then being 1 second.

As regards the busy tone, this may be mixed with an answering machine voice message (called "OGM") in the case where a party calls a subscriber who has a telephone answering machine connected on his line. This is because certain parties terminate their communication as soon as they hear an answering machine voice message. Now, according to the above-mentioned standard, the busy tone must be detected by the answering machine between 3 and 6 seconds after it has started to be sent, so that the answering machine can in its turn release the line.

In the prior art, through the U.S. Pat. No. 5,185,783, a device is known capable of detecting a signal such as that of FIG. 1 when it is mixed in a set of signals. Such a device comprises a filter capable of selecting only the frequency of the carrier (with its tolerance) in a set of signals sent on the telephone line and containing a signal such as that of FIG. 1 mixed with other signals. The signal at the output of the filter is sampled. The samples are processed as they are taken. By counting the samples and testing the crossing of a numeric threshold by the number of samples obtained during this counting, an attempt is made to determine the occurrence of a period $T_{ON}$ and then that of a period $T_{OFF}$. The presence of the signal is validated when a period $T_{OFF}$ and a period $T_{ON}$ have been detected.

This method is not satisfactory for all cases and the inventor has notably observed the following disadvantages:

the method is very sensitive to interference signals with a frequency in the frequency band of the signal to be detected. On the assumption that these signals are too numerous, one at least of the periods $T_{ON}$ or $T_{OFF}$ is not recognised, in the case of samples not recognised as belonging to a period $T_{ON}$ or $T_{OFF}$, the information contained in these samples, although capable of being significant, is lost. There results at the very least a delay in the detection of the signal.

Another device illustrated in a simplified manner in FIG. 2 is also known. This device is intended, within a facsimile machine associated with an answering machine, to enable the detection of a so-called "CNG" signal, sent by a calling facsimile machine and identifying the calling facsimile machine as such. The CNG signal consists of the modulation of an 1100±38 Hz carrier by an envelope similar to that of FIG. 1, the duration $T_{ON}$ being 0.5 seconds and the duration $T_{OFF}$ being 3 seconds. This device has a band rejection filter 10 connected to the output of a telephone answering machine 11. The output 15 of the telephone answering machine 11 is also connected to a switch 12 enabling the rejection filter 10 to be short-circuited. The rejection filter enables the frequencies of 1100±38 Hz to be removed from the OGM voice message sent by the answering machine. The telephone line access 16 is connected on the one hand to a terminal of the switch 12, the second terminal of which is connected to the output 17 of the rejection filter 10, and on the other hand to a filter 18 detecting 1100±38 Hz frequencies.

During the duration intended for the detection of the CNG signal which may be present in the signal arriving by the telephone line 16, the input 19 of the circuit 18 is capable of seeing the following signals:

a signal in which the frequencies of 1100±38 Hz are absent, in which case the signal at the output 14 of the detection filter 18 is at a first level, and a signal having components at 1100±38 Hz, in which case the output 14 is at a second level. This means that these components are from the telephone line 16, and, according to a conventional counting method such as presented above, this possibly means that the incoming signal is a CNG.

When, at the end of this duration, the CNG signal has not been detected, the switch 12 is changed to the closed position, so that the band rejection filter 10 is no longer active.

The disadvantage of this device is to degrade the OGM voice message during the duration of the detection, insofar as a broad frequency band of around 80 Hz centred on 1100 Hz is removed from the OGM signal. Likewise, in the case where this device is used to detect the busy tone, the OGM message is degraded by the removal of a frequency band of around 70 Hz, centred on 440 Hz. Now this frequency band, which corresponds to the note "A", is very much present in the voice. Another disadvantage stems from the fact that, since this method requires dedicated components (a band rejection filter and an analogue switch), the implementation of the method is complicated and thus more costly.

SUMMARY OF THE INVENTION

The object of the present invention is to propose a method and a device for detecting a periodic signal which finds a solution for the above disadvantages.

To this end, the object of the invention is a method for detecting the presence of a periodic signal amongst a set of signals, the said signal having a period of occurrence T during at least a predetermined duration $T_{ON}$, including notably a step during which:

a) in a so-called "discrimination" phase, the said signal is discriminated from the set of signals and an output signal is delivered, the level of which is representative of the result of the said discrimination of the said signal in the said set of signals, b) in a so-called "sampling" phase, the said level thus obtained is sampled in ln samples over a duration greater than one repetition period T, a method characterised in that in addition:

c) in a so-called "correlation" phase, there is made correspondence for each sample of ranking i varying from 1 to ln, of a state value B(i) representative of its level, and, over at least a first part of the sampling duration, a true correlation value SR is calculated, by cumulating, for each pair of samples of ranking i and i+Z, the instantaneous value of correlation between the state value B(i) and the state value B(i+Z), the samples of ranking i and i+Z being located at instants shifted by a period T, Z being the number of samples taken during a period T of the signal to be detected, d) in a so-called "rate calculation" phase, the rate r of samples which level is representative of the presence of the said signal is measured over at least a second part of the sampling duration, this rate r being the ratio of the number of samples for which level is representative of the presence of the signal to be detected, over the total number of samples in said second part of sampling duration, e) in a so-called "theoretical evaluation" phase, the determination of at least one so-called "theoretical correlation average" value is carried out, and f) in a "decision" phase, the true correlation value SR is compared with each theoretical correlation average value and the presence or absence of the signal to be detected is deduced according to the result of this comparison.

According to a preferred application of the invention, during said "sampling" phase, the said level thus obtained is sampled in ln samples over a duration equal to a multiple of the repetition period T, the multiplication factor being greater than or equal to 2.

According to a preferred application of the invention, the signal to be detected is a sinusoidal signal of constant frequency, amplitude and phase and the discrimination concerns this frequency.

This method meets the objectives stated above. In particular, the detection remains effective even when the periodic signal is mixed in a set of signals with a high density of interference signals.

This method also has the advantage of enabling detection of the periodic signal without affecting the integrity of the set of signals containing the said periodic signal. This is particularly advantageous when the set of signals includes signals conveying information.

This method also has the advantage of not requiring specific, and therefore costly, components.

In a particular embodiment, the calculation of the said true correlation value SR is carried out by cumulating the product B(i).B(i+Z) of the pairs of state values in accordance with the following formula:

$$SR = \sum_{i=1}^{i=\ln-Z} B(i) \cdot B(i+Z)$$

in which Z is the number of samples taken during a period T.

The formula explained here for the correlation calculation is particularly simple to implement.

In the particular embodiment, the calculation of the said first theoretical correlation average value Sabs is carried out in accordance with the following formula:

$$Sabs=(ln-Z)(1-2r)^2$$

in which Z is the number of samples during a period T.

Likewise, in this embodiment, the calculation of a second theoretical correlation average value Spre is carried out in accordance with the following formula:

$$Spre=(ln-Z)[1-4*r+4/OFF(ON*s^2+Z*r^2-2*ON*r*s)]$$

in which s is the probability of detecting the samples delivered during the duration $T_{ON}$ of the periodic signal, ON is the number of samples during a duration $T_{ON}$ OFF is the number of samples during a duration $T_{OFF}$ of "silence" between two $T_{ON}$ durations.

and, during the decision phase, the true correlation value SR is compared with the two theoretical correlation average values Sabs and Spre and the presence or absence of the signal to be detected is deduced according to the result of these comparisons.

According to this particular embodiment, the theoretical average values correspond to results of estimations starting from respective assumptions of the presence and absence of the signal to be detected. They therefore form indicators adapted to the taking of an effective decision.

The invention also applies to a device for detecting the presence of a periodic signal amongst a set of signals, the said signal having a period of occurrence T during at least a predetermined duration $T_{ON}$, including notably a discrimination means, which selects the said signal in the set of said signals and delivers an output signal, the level of which is representative of the discrimination of the said signal in the said set of signals, characterised in that it also includes:

sampling means adapted to sample the level thus obtained in ln samples over a duration greater than one repetition period T, and processing means including notably calculation and storage means adapted:

to cause to correspond, to each sample of ranking i varying from 1 to ln, a state value B(i) representative of its level, and to calculate, over at least a first part of the sampling duration, a true correlation value SR, by cumulating, for each pair of samples of ranking i and i+Z, the instantaneous value of correlation between the state value B(i) and a state value B(i+Z), the samples of ranking i and i+Z being located at instants shifted by a period T, Z being the number of samples taken during a period T of the signal to be detected, to measure over at least a second part of the sampling duration the rate r of samples which level is representative of the presence of the said signal to be detected, this rate r being the ratio of the number of samples for which level is representative of the presence of the said signal to be detected over the total number of samples of said second part of sampling duration, to determine at least one so-called "first theoretical correlation average" value Sabs, and to compare the true correlation value SR with each theoretical average correlation value and deduce the presence or absence of the signal to be detected according to the result of this comparison.

The invention also applies to a telecommunication installation, a facsimile machine and an answering machine incorporating a device according to the invention.

Other characteristics and advantages of the invention will emerge below with the help of the following description, produced with reference to the accompanying drawings

DETAILED DESCRIPTION

It should be noted that the description below relates to the detection of the presence of a periodic signal, the frequency of which is the main characteristic. However, the invention applies readily, for the expert, to the detection of signals of which it is the amplitude, the phase, or more generally any information modulating a physical magnitude which is the characteristic, amongst the set of signals.

Throughout the description, the word "correlation" is used to designate a mathematical operation which, to a series of numbers B(i), where i represents the ranking in the series, and at a step Z, makes correspond the sum of all the products B(i).B(i+Z), such that both these elements are in the said series.

Figure 1:
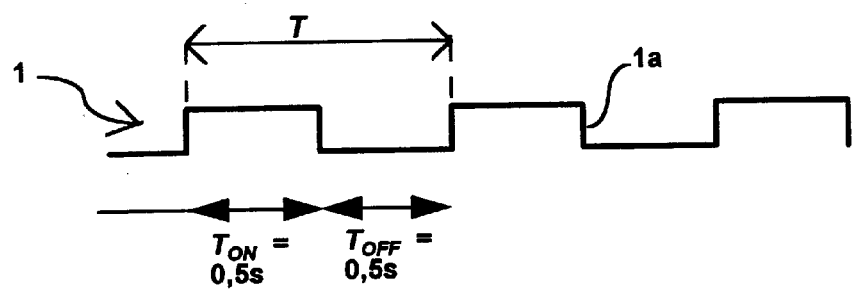
FIGS. 1 and 2 show a type of signal to be detected when mixed with other signals and a known device for such detection.
Figure 2:
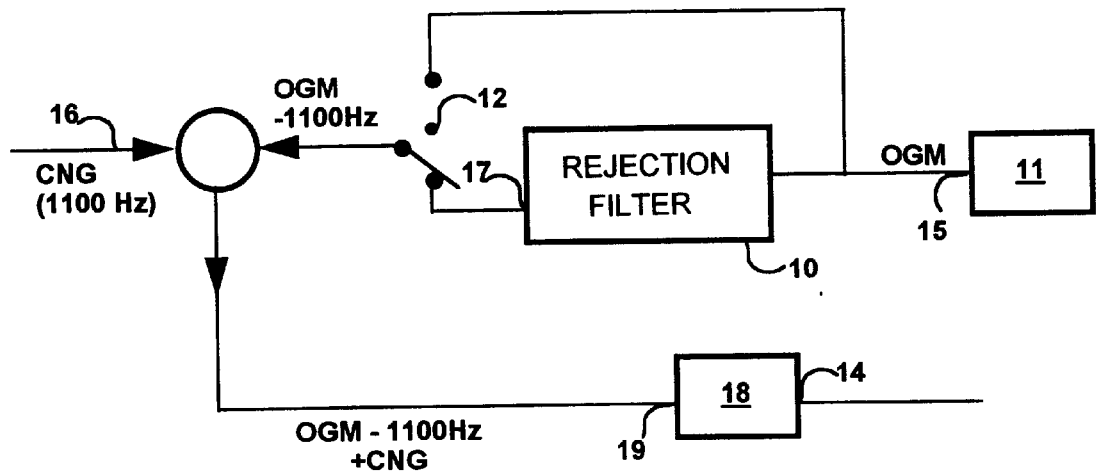
Figure 3A:
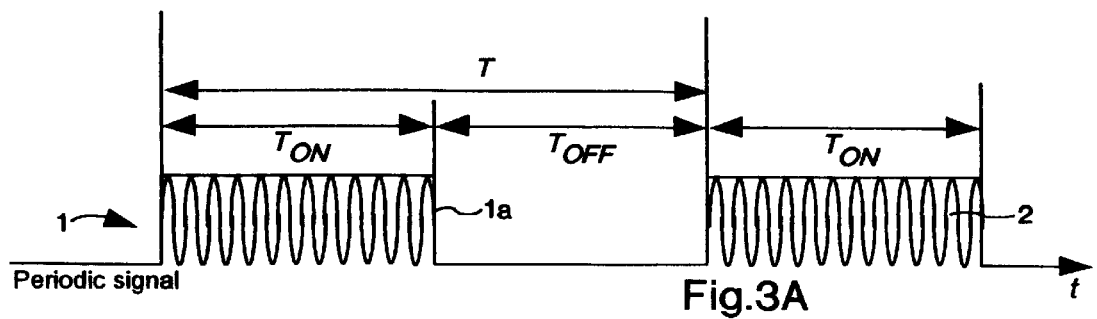
FIGS. 3A, 3B, 3C, 3D and 3E illustrate a signal in the course of processing by the method according to the invention.

FIG. 3A shows an example of a periodic signal 1 detectable by the invention (called "signal to be detected"). This signal has identical characteristics to that described in FIG. 1. It should be stated that, in general, it comprises, during its period T, the sending of at least one frequency f during a first predetermined duration $T_{ON}$ and an absence of sending during a second predetermined duration $T_{OFF}$. The frequency f belongs to a predetermined frequency band going from $f_1$ to $f_2$.

The predetermined frequency band going from $f_1$ to $f_2$ may belong to any frequency domain: voice frequencies, high or ultra high frequencies, etc.

Figure 3B:
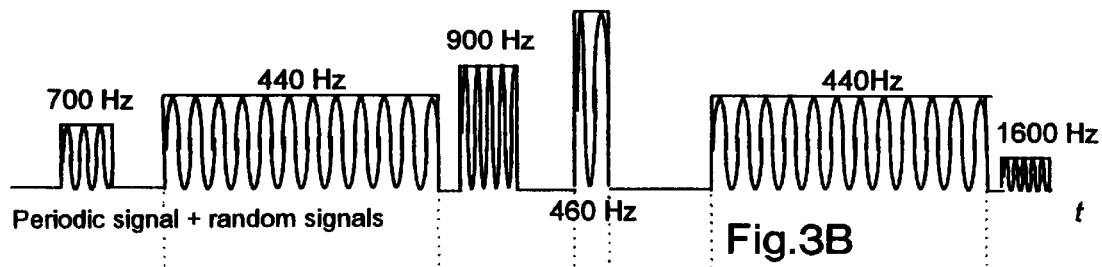

FIG. 3B illustrates a very simplified example of a set of signals capable of being processed by the method according to the invention.

In general, the set of signals contains various signals besides the signal to be detected. These various signals may for example comprise:

noise, which may or may not contain interference signals of frequency belonging to the predetermined frequency band going from $f_1$ to $f_2$, periodic signals, which may comprise signals with frequencies belonging to the predetermined frequency band going from $f_1$ to $f_2$, analogue signals of non-periodic type, random or not, representing for example the human voice, which may or may not include interference signals of frequency belonging to the predetermined frequency band going from $f_1$ to $f_2$.

In the example of FIG. 3B, the periodic signal of FIG. 3A is mixed with various signals here comprising sinusoidal signals of frequencies respectively equal to 700 Hz, 900 Hz, 460 Hz, 1600 Hz.

In accordance with the method according to the invention, in a so-called "discrimination" phase, the frequency of the carrier of the signal to be detected is discriminated from the other frequencies in the set of signals with discrimination means and an output signal is delivered which has two levels representing respectively the presence or the absence of the said frequency in the set of signals.

The discrimination means will be described below, with reference to FIG. 4. They are here adapted to detect the presence of frequency components between $f_1$ (here equal to 406 Hz) and $f_2$ (here equal to 474 Hz) in the set of signals.

Figure 3C:
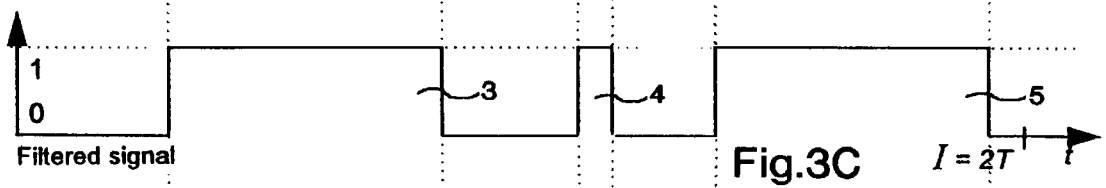

In the case in point, at the end of the discrimination phase, in time correspondence with the signal of FIG. 3B, the discrimination means present as an output a signal in accordance with that of FIG. 3C. It is observed that the two periods $T_{ON}$ of the signal of FIG. 3A correspond to two rectangular pulses 3 and 5. Furthermore, the interference signal at 460 Hz corresponds to the portion 4 of the signal. It is noted that the signal of FIG. 3C is a two-level signal, the high level of which corresponds to the presence of frequency components contained within the said predetermined frequency band, and the low level of which corresponds to the absence of such frequency components.

Figure 3D:
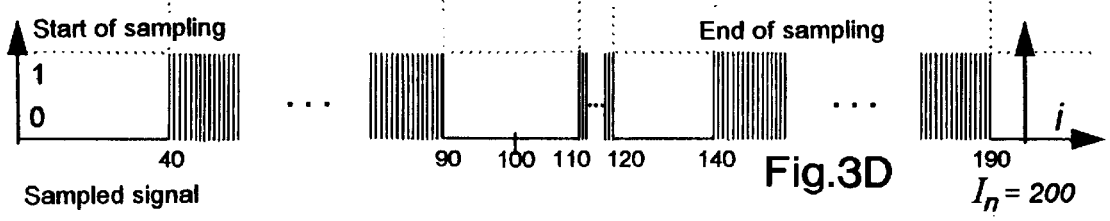

Next, in accordance with the invention, in a so-called "sampling" phase, the level obtained is sampled in ln samples over a duration equal to a multiple of the repetition period T, the multiplication factor being greater than or equal to 2. In the example of FIG. 3D, the signal shown lasts slightly more than two seconds, the period T is equal to one second, the sampling duration is equal to two T periods, that is two seconds, and ln is equal to 200, the sampling frequency being 100 Hz. i being the ranking of the sample in the set of ln samples, when the sample i corresponds to a high level at the output of the discrimination means, the binary value "1" is assigned to A(i), in a table A, as described below, and when the sample i corresponds to a low level at the output of the discrimination means, the binary value "0" is assigned to A(i), in a table A, as described below.

In FIG. 3D, it is seen that the output signal portions 3, 4 and 5 of FIG. 1C have here given rise, after a sampling at a frequency of 100 Hz:

to 50 samples for the rankings i varying from 41 to 90, then to 10 samples for the rankings i varying from 111 to 120, then again to 50 samples for the rankings i varying from 141 to 190.

For all these samples, A(i) is equal to 1 and for all the others A(i) is equal to 0.

Next, in a so-called "correlation" phase, first of all there is made correspondence for each sample of ranking i varying from 1 to ln, of a state value B(i) representing its level.

According to a particular embodiment of the invention, the value B(i) is chosen equal to −1 if the level of the sample represents the presence of a frequency component between $f_1$ and $f_2$,; on the other hand it is equal to +1 in the contrary case. This is expressed in the case in point by the use of the following formula:

$$B(i)=(-1)^{A(i)}$$

A(i) being the logic level of the sample i under consideration.

In application of the above formula, there is made correspondance for each of the samples i of ranking from 1 to 40, from 91 to 110, from 121 to 140, and from 191 to 200 of the state value B(i)=1. Likewise, the state value B(i)=−1 is made to correspond to all the samples i of ranking from 41 to 90, 111 to 120, and 141 to 190.

In the correlation phase, over at least a first part of the sampling duration, which, in the preferred embodiment, is the entire duration of sampling, a true correlation value SR is calculated, by cumulating, for each sample of ranking i, i varying between 1 and ln−Z, the instantaneous value of correlation between the state value B(i) and the state value B(i+Z). Z being the number of samples taken during a period T, the samples i and i+Z are taken at instants shifted by a period T.

Figure 3E:
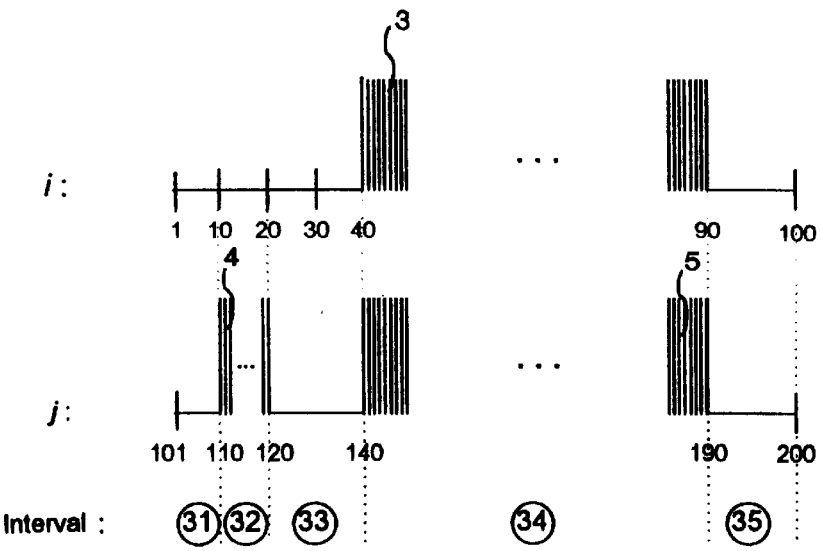

FIG. 3E illustrates the correlation phase as it is implemented in the particular embodiment of the invention. The signal of FIG. 3D is considered and is divided into two durations equal to a period T (1 second) and the correlation of these two parts of the signal is carried out with a step equal to Z. FIG. 3E shows, on the upper line, the first part of the sampled signal between the samples 1 and 100 and, on the second line, the second part of the sampled signal of FIG. 3D corresponding to the samples 101 to 200.

On the second part the portions 4 and 5 of the signal of FIG. 3E are shown.

Visually, the corresponding placing of the portions 3 and 5 of the signal is noted, corresponding to the periods $T_{ON}$ of the signal to be detected.

In accordance with the invention, a true correlation value SR will be calculated by cumulating the product B(i).B(i+Z) for each sample of ranking i, i going from 1 to ln−Z.

Here, the instantaneous correlation value is determined by the product B(i).B(i+Z), i varying from ranking 1 to ranking ln−Z, here equal to 200−100=100.

The value SR is therefore given by the formula $$SR = \sum_{i=1}^{i=\ln-Z} B(i) \cdot B(i+Z)$$

Consequently, the signal of FIG. 3E will give the values shown in the table below:

so-called "first theoretical correlation average" value Sabs is carried out. According to the particular embodiment, this first theoretical correlation average is a function of the rate r and varies with it. According to another particular embodiment, during the theoretical evaluation phase, the determination of a so-called "second theoretical correlation average" value Spre is carried out, which, according to a still more particular embodiment, is also a function of the rate r varying with it.

Figure 4:
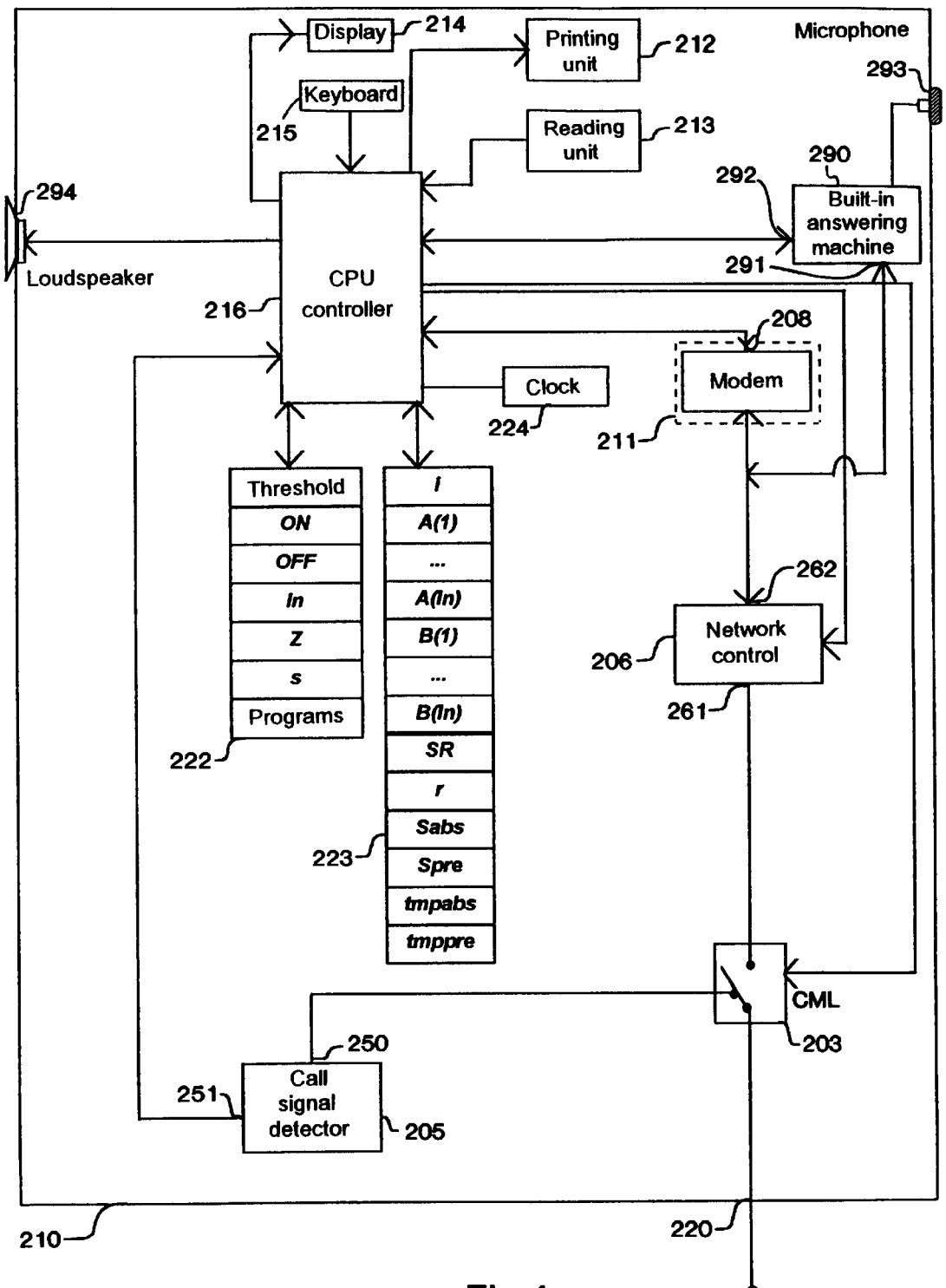
FIG. 4 shows a block diagram of a facsimile machine incorporating a periodic signal detection device according to the invention.

According to the aspect of the invention described as an example with reference to FIGS. 3 to 5, the first theoretical average value is determined as being the correlation average value of a sampled signal having a rate of samples representing the presence of the frequency of the signal to be detected, equal to the rate r, assuming the absence of the signal to be detected in the said set of signals.

The determination of the theoretical average value Sabs is made, as justified below, according to the formula:

$$Sabs = (ln-Z)(1-2r)^2$$

where Z is the number of samples during a period T.

In this example, Sabs=1.

According to the same particular aspect of the invention, the second theoretical average value is determined as being the correlation average value of a sampled signal having a rate of samples representing the presence of the frequency of the signal to be detected equal to r, assuming the presence of the signal to be detected in the said set of signals.

The determination of the theoretical average value Spre is made, as justified below, according to the formula:

| INTERVAL | 31 | 32 | 33 | 34 | 35 |
| --- | --- | --- | --- | --- | --- |
| INDEX i | from 1 to 10 | from 11 to 20 | from 21 to 40 | from 41 to 90 | from 91 to 100 |
| INDEX i + Z (Z = 100) | from 101 to 110 | from 111 to 120 | from 121 to 140 | from 141 to 190 | from 191 to 200 |
| B(i) · B(i + Z) | 1 × 1 = 1 | 1 × (−1) = −1 | 1 × 1 = 1 | (−1) × (−1) = 1 | (1) × (1) = 1 |
| Number of samples | 10 | 10 | 20 | 50 | 10 |
| Sum of the instantaneous correlations over the interval | +10 | −10 | +20 | +50 | +10 |
| SR | 10 | 0 | 20 | 70 | 80 |

It is observed that, in the example illustrated in FIGS. 3A to 3E, a total true correlation value SR of 80 is obtained.

In accordance with the invention, in a so-called "rate calculation" phase, a rate r representing the presence of the said frequency is measured over at least a second part of the sampling duration, which in the preferred embodiment, is the entire duration of the sampling.

In this embodiment, the calculation of r is carried out by application of the formula:

$$r = \sum_{i=1}^{i=ln} A(i)/ln$$

A(i) representing the logic level of the sample of ranking i.

In the present example, the sampled signal has a rate r equal to 110/200, that is 0.55, insofar as it contains 110 samples of value 1 corresponding to the signal portions 3, 4 and 5 of FIG. 3E.

Next, in a so-called "theoretical evaluation" phase, in general according to the invention, the determination of a $$Spre = (ln-Z)[1-4*r+4/OFF\ (ON*s^2+Z*r^2-2*ON*r*s)]$$

in which s is the probability of detecting the samples delivered during the duration $T_{ON}$ of the periodic signal, ON is the number of samples during a duration $T_{ON}$, OFF is the number of samples during a duration $T_{OFF}$ of "silence" between two $T_{ON}$ durations.

In the example of FIGS. 3A to 3E, the number s is, for example, set equal to 1, ON is equal to 50, since the duration $T_{ON}$ of presence of the signal is 0.5 seconds, and OFF is equal to 50 since the duration $T_{OFF}$ of "silence" between two $T_{ON}$ durations is 0.5 seconds and the frequency is 100 Hz.

In this example, Spre=82.

To specify the procedures for determining the above formulae: starting from the assumptions that the set of signals received does not contain the signal which an attempt is being made to detect, but where the discrimination means has detected, over the set of ln samples, a rate r of times the presence of the frequency of the signal to be detected, each sample has the same probability (that is r) of corresponding to the detection by the discrimination means of the frequency of the signal to be detected and the same probability (that is 1−r) of corresponding to the absence of detection by the discrimination means of the frequency of the signal to be detected. The states B(i) and B(i+Z) being independent, the probability that the product B(i).B(i+Z) is equal to 1 is $(1-r)^2+r^2$ and the probability that B(i).B(i+Z) is equal to −1 is 2r.(1−r). By cumulating these probabilities for all the samples of ranking from 1 to ln−Z, $$Sabs=(ln-Z).(1-2r)^2$$

is obtained.

In the same way, assuming that the signal to be detected is present in the filtered signal, the probability r of discriminating the signal to be detected may be divided into:

on the one hand the probability s of detecting the signal when it is present (during the ON periods) with s approximately equal to 1, for a proportion of (ON/ON+OFF) samples;

on the other hand the probability r' of detecting the signal when it is absent (during the OFF periods), this presence then being due to noise for a proportion of (OFF/ON+OFF) samples, that is $$r=(ON/Z)*s+(OFF/Z)*r'$$

with:

$$ON+OFF=Z$$

In a manner similar to the calculation of Sabs, Spre is obtained:

$$Spre=(ln-Z)*[ON/Z(1-2s^2)+OFF/Z(1-2r')^2]$$

therefore:

$$Spre=[(ln-Z)/Z]*[ON-4*ON*s^2+4*ON*s+OFF\\*(4*(Z^2*r'^2*ON*s^2-2*Z*ON*r'*s)/OFF-4*Z+4*ON*s]$$

that is:

$$Spre=[(ln-Z)/Z]*[Z-4*Z*r+4*Z*(Z*r^2+ON*s^2-2*ON*r*s)/OFF]$$

from where the value of Spre given above is easily deduced.

Finally, in a decision phase, the correlation value SR is compared with the theoretical correlation average value(s) and the presence or absence of the signal to be detected in the set of received signals is deduced from this (these) comparison(s).

According to the aspect of the invention developed with reference to FIGS. 3 to 5, during the decision phase, a comparison is made on the one hand of the value of the rate r to the constant Threshold and on the other hand of the true correlation value SR (here equal to 80) with the two average theoretical correlation values Sabs (here equal to 1) and Spre (here equal to 82) and the presence or absence of the signal to be detected is deduced according to the result of this comparison.

Here, the constant Threshold is equal to 0.40, by applying, on the one hand, the tolerances of values to the formula corresponding to the rate of samples representing the presence of the signal to be detected: ON/(ON+OFF), with the values 450 and 550, which gives the minimum value 450/(450+550)=0.45 and by applying, on the other hand, an additional tolerance of 0.05 which is subtracted at the minimum value of 0.45.

According to a particular embodiment, it is decided that the signal to be detected is present in the received signals when both the value of the rate r is greater than the constant Threshold and the absolute value of the difference between SR and Spre is less than the absolute value of the difference between SR and Sabs.

In the example of FIGS. 3A to 3E, r is equal to 0.55 and is greater than the constant Threshold, equal to 0.40, and the said absolute values are equal to respectively 2 and 79 and, according to the particular embodiment, it is decided that the signal to be detected is present.

FIG. 4 shows a device according to the invention, incorporated in a facsimile machine 210 connected to a telephone line 220 and using the most particular embodiment of the method according to the invention. In this Figure, there are characteristic elements necessary for the operation of the device according to the invention:

calculation means 216, for example composed of a microcontroller;

storage means comprising a random access memory 223 and a read-only memory 222, connected to the calculation means 216. The random access memory 223 stores the variables i, SR, r, Sabs, Spre, tmpabs, tmppre and the two tables of variables A(i) and B(i), each having ln variables, in registers which bear the same names as the variables they contain. The read-only memory 222 stores the instructions for the calculation means 216, enabling it to execute the phases described with reference to FIG. 3, according to the flow diagrams presented with reference to FIGS. 5A, 5B and 5C, and the constants necessary for the execution of this program, ON, OFF, ln, Z, Threshold and s in memory locations bearing the same names as the constants;

a clock 224 connected to the calculation means 216, for example composed of a clock generator and a frequency divider, supplying electrical pulses to the calculation means 216.

In addition, the facsimile machine 210 has elements of known type, necessary for its operation and all connected electrically to the calculation means 216:

a reading unit 213 intended to read the documents, a representation of which has to be transmitted over the telephone line 220 by conventional techniques;

a printing unit 212 intended to reproduce the documents received over this telephone line;

a keyboard 215 intended to receive commands from the user and a screen 214 intended to display operational messages from the facsimile machine 210;

a discrimination means 211, here composed of a modulator/demodulator 208, called in the remainder of the description "modem". By way of example of a modem implementing a function of discriminating frequencies centred on 440 Hz, in the range 406 to 474 Hz, the ROCKWELL modem, referenced R96DFXL, may be cited. This discrimination means 211 has therefore, in the embodiment of FIG. 4, both the frequency selection function and the conventional functions of a modem;

a built-in answering machine 290 associated with a microphone 293 intended to record sound messages from the user in the form of messages known under the name OGM ("OutGoing Message"). In this embodiment, this is the circuit marketed under the reference TC88401F-06 by the TOSHIBA company, located in Japan, associated with a digital-to-analogue converter of known type;

a loudspeaker 294 intended to emit, among others, the message recorded by the built-in answering machine;

a relay 203 known under the name CML, intended to change over an electrical connection between the telephone line 220 and either an input 250 of a call signal detector 205 or an input 261 of a network control means 206. The position of this CML relay 203 is controlled by the calculation means 216;

the incoming call signal detector 205 intended to detect a call signal known under the name "CI" coming from the telephone network 220, by means of the CML relay 203, and consequently to deliver a signal on its output port 251;

the network control means 206, intended to implement, in a conventional manner, the electrical interface between certain of the other elements of the facsimile machine 210 and the telephone line 220.

The operation of the device of FIG. 4 will now be described.

In the standby mode the calculation means 216 control the CML relay 203 so that the telephone line 220 is electrically connected to the call signal detector 205, on its input port 250. In this standby mode, the call signal detector 205 takes, on its output port 251, two states representing the presence or the absence, on the telephone line 220, of a "CI" call signal. Still in this standby mode, the calculation means 216 regularly read the state of the output port 251. As soon as the presence of a "CI" signal is validated according to known procedures, the calculation means change into facsimile mode.

In this mode, the calculation means 216 control the changeover of the CML relay 203 so that the telephone line 220 is connected to the network control means 206. Simultaneously, the calculation means 216 control the sending of the OGM message by the built-in answering machine 290, on the telephone line 220, through the network control means 206 and the CML relay 203.

At this moment a line busy signal may arrive on the telephone line 220, coming from the telephone network, not shown. It is this signal which the device according to the invention detects.

The discrimination means 211 selects the frequencies of the range from 406 to 474 Hz, in the signals reaching it from the telephone line 220, through the CML relay 203 and the network control means 206, and delivers, to the calculation means 216, an output signal with two levels representing respectively the presence or the absence of the said frequency in the said set of signals.

Figure 5A:
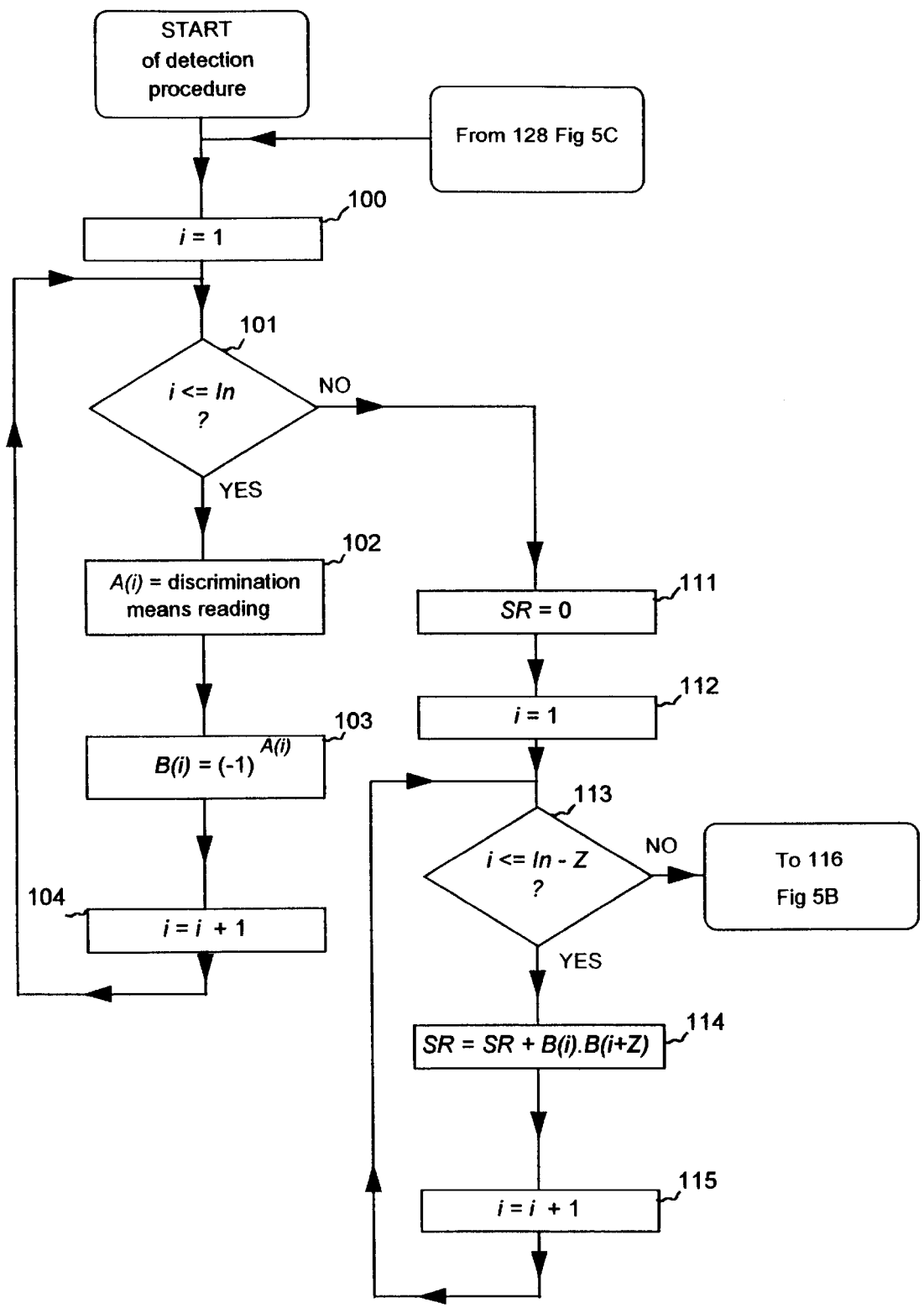
FIGS. 5A, 5B and 5C show a flow diagram of a program used in the device according to the invention.
Figure 5B:
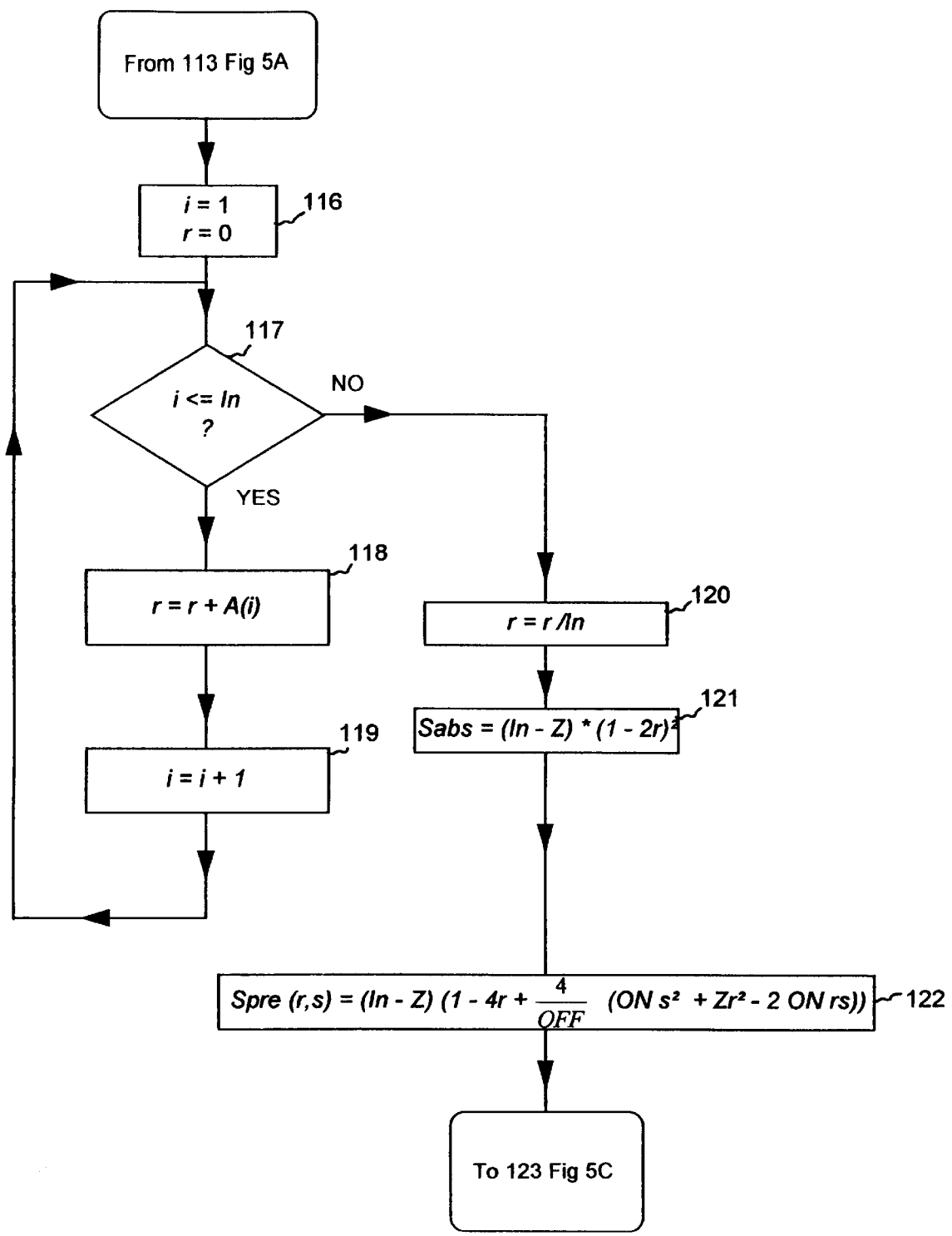

The calculation means 216, in cooperation with the clock 224, regularly come to read the signal leaving the discrimination means 211 and apply to it the operations described with reference to FIGS. 5A, 5B and 5C, starting from the operation 100, this being performed only after detection, during a predetermined duration (here for example equal to 20 ms) of the presence of the signal frequency sought (here 440 Hz). They thus implement the method described with reference to FIGS. 3A to 3E. To this end, the clock 224 may, for example, cause an interrupt in the operation of the calculation means 216 which, under this interrupt, reads the output signal of the discrimination means 211.

When, according to the said method, the calculation means 216 have recognised the line busy signal, they control the switching of the CML relay 203 into its standby position in order to release the line and return to standby mode. Otherwise, the CML relay 203 remains in the position which makes an electrical connection between the telephone line 220 and the network control means 206 and continues the operating procedure of the facsimile machine in a conventional manner, then releases the line by causing the CML relay 203 to switch and then returns to standby mode.

The operation of the processing means will now be described with reference to the flow diagrams of FIGS. 5A, 5B and 5C.

The operations described below start when the calculation means change from the standby mode to the facsimile mode and the main program implemented in the facsimile machine has detected the presence of the frequency of the busy signal (440 Hz), for a sufficient duration, here 20 ms. It should be noted that the operations described with reference to FIGS. 5A, 5B and 5C may be performed in parallel with operations of sending an OGM (outgoing message) signal, the recording of an ICM (incoming message) message or communication in facsimile mode.

The operation 100 consists of setting to the value 1 the variable i present in the register i of the random access memory 223.

The test 101 consists of testing whether the variable i is less than or equal to the constant ln stored in the read-only memory 222. Where this test gives a negative result, the calculation means go to the operation 111. Where this test gives a positive result, the operation 102 consists of the reading of the signal leaving the discrimination means 211 by the calculation means 216, at the instant of each pulse from the clock 224 and the placing of the result of this read into the i-th register of the table of registers A(i), a table composed of ln registers. Then, the operation 103 consists of assigning the value $$(-1)_{A(i)}$$

to the i-th register of a table B(i) which contains a number ln of registers. The operation 104 consists of incrementing the variable i by a value 1 and then returning to the test 101.

The loop from the test 101 to the operation 104 is thus repeated ln times, that is to say during a sampling period which lasts an integer number of times the period T of the signal to be detected.

The operation 111 consists of setting to the value 0 the variable SR contained in a register SR of the random access memory 223. The operation 112 consists of resetting the variable i to the value 1. The test 113 consists of testing whether the variable i is less than or equal to the value ln−Z, Z being a constant stored in the read-only memory 222. Where this test 113 gives a negative result, the calculation means 216 perform the operation 116 (FIG. 5B) described below. Where the test 113 gives a positive result, the operation 114 increases the value of the variable SR by the instantaneous correlation product, that is to say, in this embodiment, the product of the value of the variable B(i) times the value of the variable B(i+Z). The operation 115 performs the incrementing of the value of the variable i. The calculation means 216 then return to the test 113. The loop from the test 113 to the operation 115 performs the calculation of the true correlation SR.

The operation 116 consists of setting the value of the variable i to 1, and the value of a variable r, present in the register r of the random access memory 223, to 0.

The test 117 tests whether the value of the variable i is less than or equal to the value of the constant ln. If the result of this test is negative, the calculation means 216 perform the operation 120 described below. If the result of the test 117 is positive, the operation 118 increments the value of the variable r by the value A(i) and then the operation 119 increments the value of the variable i by 1. After the operation 119, the processing means return to the test 117. The operation 120 consists of dividing the value of the variable r by the constant ln. The operations 117 to 120 thus consist of calculating the value of the rate r.

The operation 121 consists of calculating the value $$Sabs=(ln-Z)\ (1-2r)^2$$

where Z is the number of samples corresponding to a period T, Z being a constant stored in a register Z of the read-only memory 222.

The operation 122 consists of calculating the value $$Spre=(ln-Z)\ [1-4*r+4/\text{OFF}\ (\text{ON}*s^2+Z*r^2-2*\text{ON}*r*s)]$$

where s: probability of detecting the samples delivered during the duration $T_{ON}$ of the periodic signal, a constant stored in a register s of the read-only memory 222.

ON: number of samples during a duration $T_{ON}$, a constant stored in a register ON of the read-only memory 222.

OFF: number of samples during a duration $T_{OFF}$ of "silence" between two $T_{ON}$ durations, a constant stored in a register OFF of the read-only memory 222.

Figure 5C:
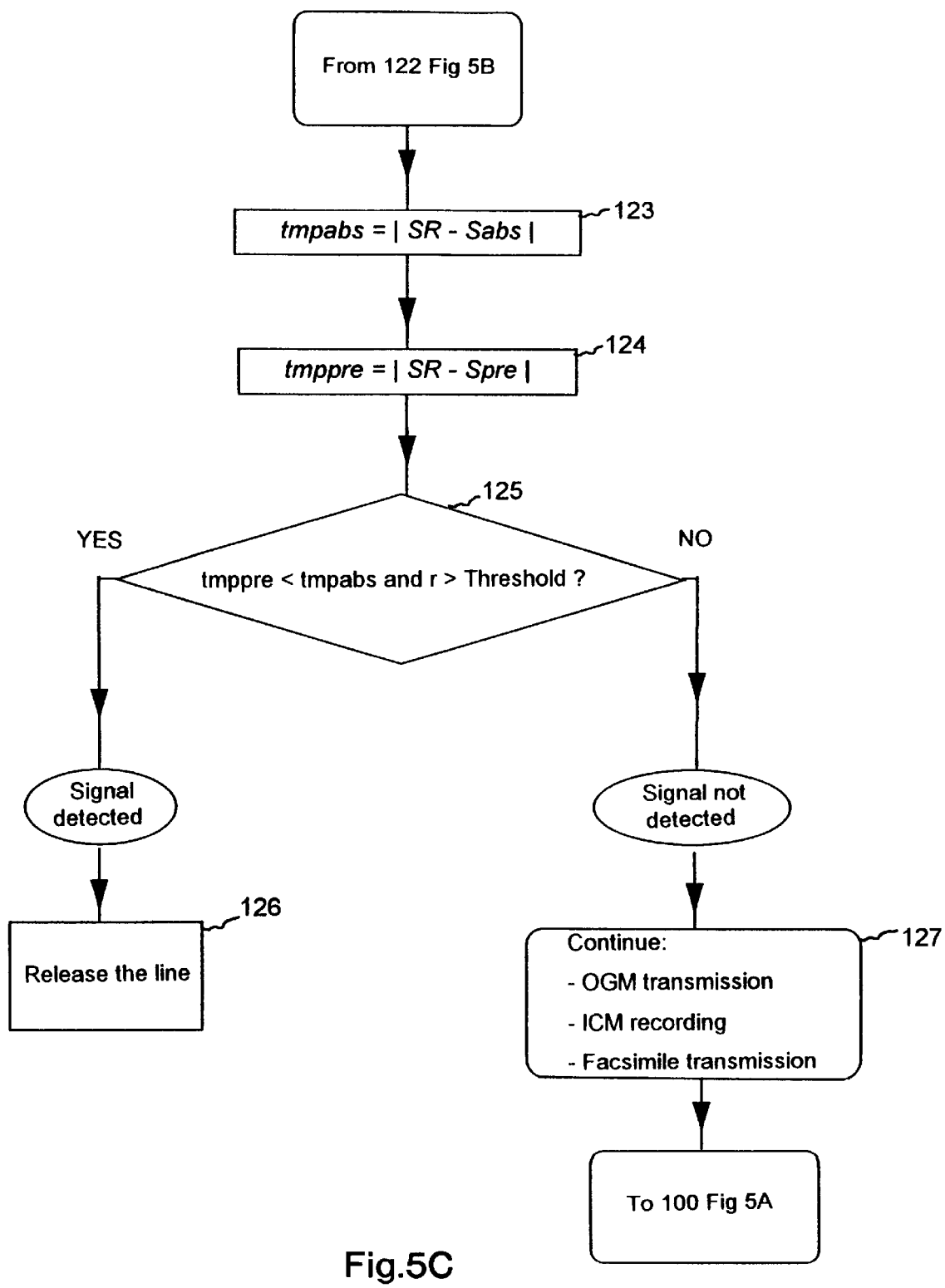

Then the calculation means 216 perform the operation 123 (FIG. 5C). This consists of calculating the value of a variable tmpabs, stored in a register tmpabs of the random access memory 223, the said variable tmpabs being equal to the absolute value of the difference SR minus Sabs. Then the operation 124 consists of calculating the value of a variable tmppre, stored in a register tmppre of the random access memory 223, the said variable tmppre being equal to the absolute value of the difference SR minus Spre.

The test 125 consists of testing whether simultaneously on the one hand the rate r is greater than a constant Threshold and on the other hand tmppre is less than tmpabs and of giving the result of this test as the result of the detection of the frequency sought. If this result is positive, the signal is detected and the calculation means 216 perform the operation 126, which consists of releasing the line by controlling the changeover of the CML relay 203. If this result is negative, the signal is not detected and the calculation means 216 perform the operation 217, which consists of continuing, as applicable, the transmission of a so-called OGM (OutGoing Message) signal, the recording of a so-called ICM (InComing Message) signal or the communication in facsimile mode. Following the operation 127, the calculation means 216 return to the operation 100 (FIG. 5A).

Figure 6A:
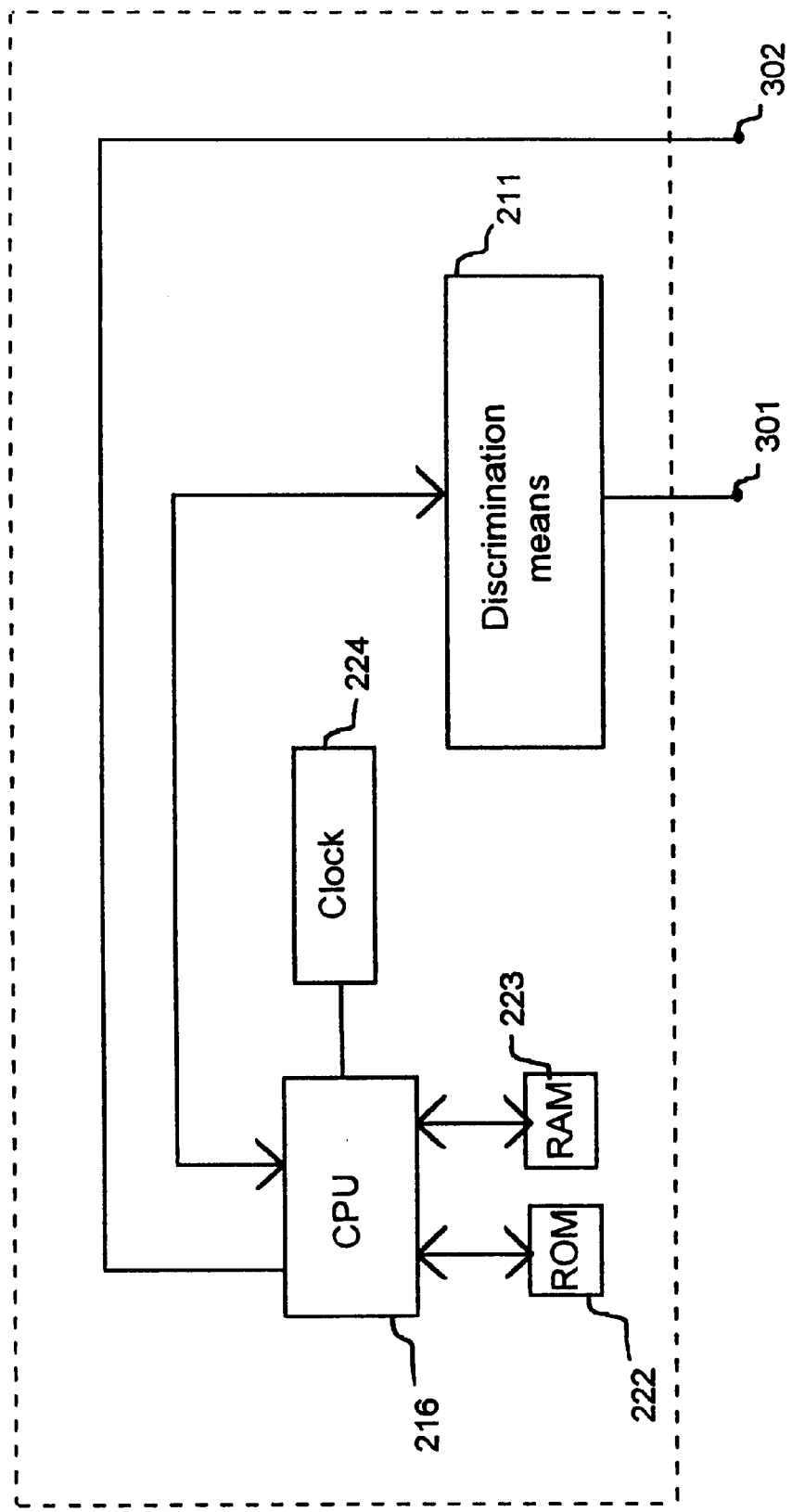
FIGS. 6A, 6B and 6C show respectively block diagrams of a signal detector, a telephone answering machine and a second embodiment of a facsimile machine incorporating the device according to the invention.

FIG. 6A shows a signal detector intended to receive any periodic signal as an input and to send a binary signal according to the presence or absence of the signal to be detected in the said periodic signal.

This signal detector comprises:

calculation means 216, for example composed of a microcontroller;

storage means comprising a random access memory 223 and a read-only memory 222, connected to the calculation means 216;

a clock 224 connected to the calculation means 216, for example composed of a clock generator and a frequency divider, supplying electrical pulses to the calculation means 216.

All these elements have the same characteristics and the same functions as presented above.

The signal detector also has a signal output 302 on which the calculation means 216 send a signal representing the detection or otherwise of the signal sought. The discrimination means 211 may take a number of forms presented with reference to FIGS. 4 (modem), 6B (bandpass filter cooperating with an analogue-to-digital converter) and 6C (bandpass filter).

Figure 6B:
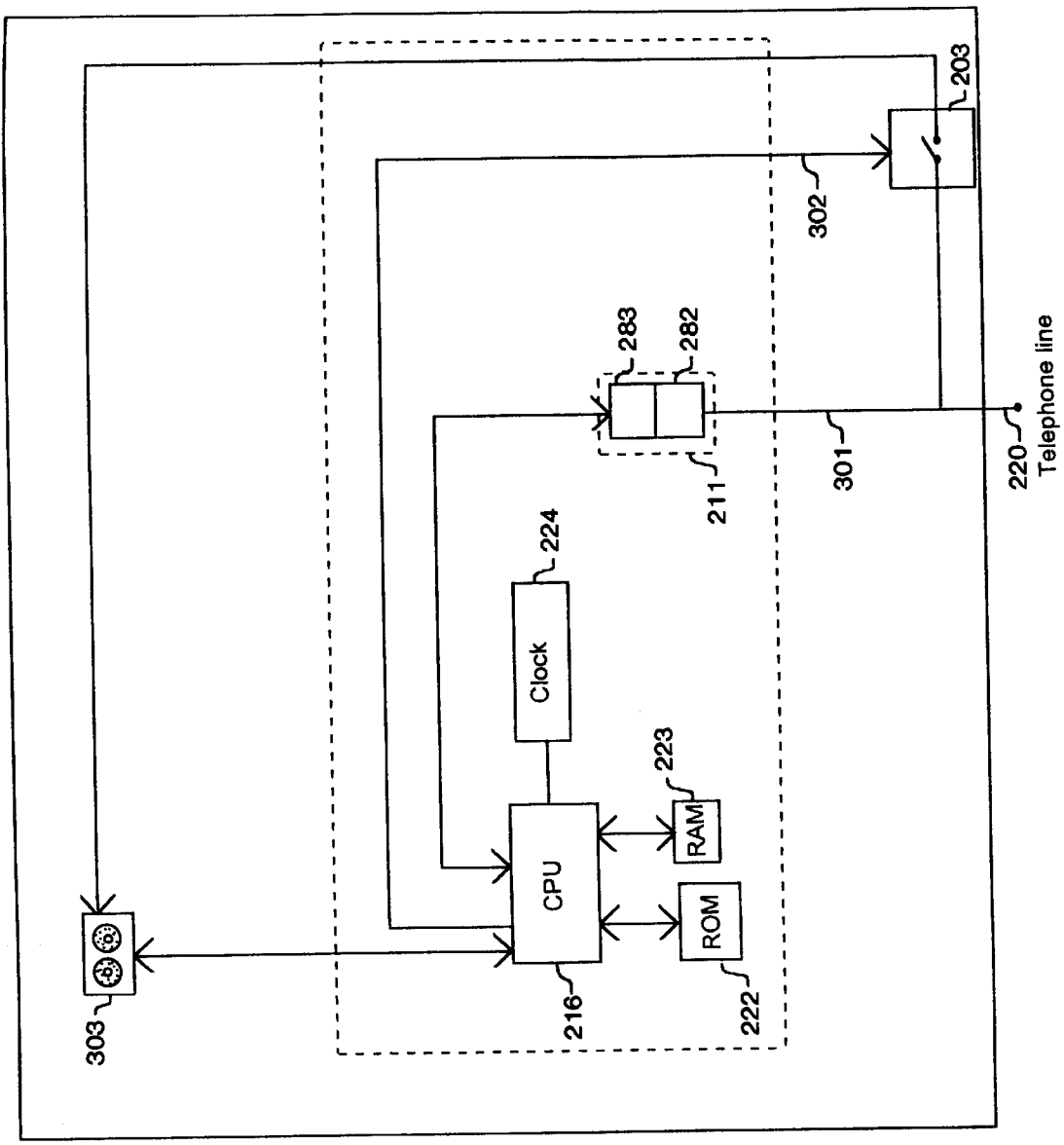

FIG. 6B shows, in a telephone answering machine, the same elements as in FIG. 6A, the discrimination means 211 here being composed of a bandpass filter 282 which allows preferential passage of the signals with frequencies in the frequency band from f1 to f2, in which the frequency of the signal to be detected is found, being centred on this frequency, the said filter cooperating with an analogue-to-digital converter 283, according to a known electronic arrangement.

To these elements are added a sound message recording means 303, known in the telephone answering machine field, and a relay 203 which is capable of connecting the recording means 303 to the telephone line 220, in parallel with the discrimination means 211, or on the contrary, of disconnecting the telephone line 220 from the message recording means 303.

The switching of the relay 203 into one or the other of its positions is controlled by means of the output 302 of the calculation means 216. In this way, the device is permanently adapted to switch its operation between a line release mode (the relay then not connecting the message recording means to the telephone line) if the presence of the busy signal is detected, and a telephone communication continuation mode (the message recording means then being connected to the telephone line), in the contrary case.

It should be noted that, in parallel with the release of the line, the calculation means 216 order the message recording by the recording means 303 to be stopped.

Figure 6C:
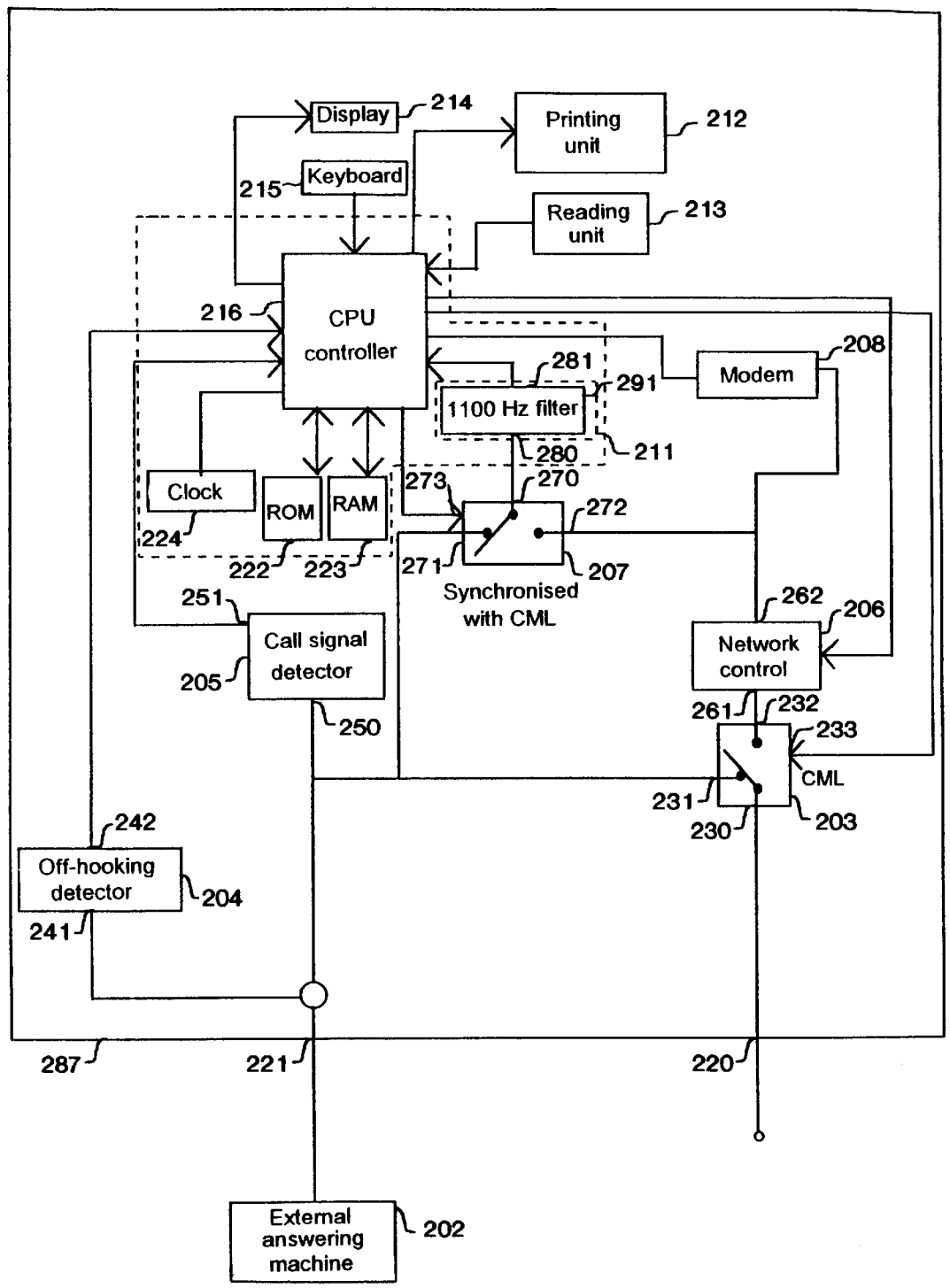

FIG. 6C shows a facsimile machine 287 incorporating the elements of FIG. 4, with the exception, on the one hand, of the built-in answering machine 290 and the microphone 293, and on the other hand, the loudspeaker 294. In this FIG. 6C, an external answering machine 202 is connected to the facsimile machine 210 in such a way that the relay 203 can connect this answering machine 202 to the telephone line 220, in parallel with the off-hooking detector 204, the call signal detector 205 and the analogue electronic switch 207, or on the contrary, connect the telephone line 220 to the network control means 206. The discrimination means 211 is composed of a filter 291 centred on the frequency 1100 Hertz, corresponding to the so-called "CNG" signal.

In the standby state, the microprocessor 216 regularly comes to read on the one hand an output 242 of an off-hooking detector 204 in order to determine whether the external answering machine 202 has seized the telephone line 220 and on the other hand an output 251 of the call signal detector 205. These reads are made every 10 ms.

When a call signal is received on the line 220, it is, on the one hand, directed to the external answering machine 202, and, on the other hand, to the call signal detector 205. The operating program of the facsimile machine 210 then controls the counting of the call signals. This is because, in accordance with the French standards on the subject, the facsimile machine must off-hook the line before 15 seconds, and conventionally the logic means of the facsimile machine count the rings and off-hook after the second ring.

The line may here be seized in two ways:

by the answering machine 202 if it is in service, by the facsimile machine.

The off-hooking detector 204 detects the line seizure made by the external answering machine 202. As the output 242 of the off-hooking detector 204 is monitored by the microprocessor 216, which is informed of this seizure 10 ms afterwards, at the latest.

Furthermore, in this embodiment, an input 280 of a bandpass filter 291 is connected to an analogue output 270 of a second analogue electronic switch 207 controlled by the microprocessor 216.

The analogue electronic switch 207 is adapted to change over the output 270:

on the one hand, to an input 272 connected to an output 262 of the network control unit 260, on the other hand, to an input 271 connected to an input 221 of the facsimile machine 210 and connected to the external answering machine 202.

Furthermore, the CML electronic switch 203 and the analogue electronic switch 207 are synchronous, and in this embodiment, this synchronisation is provided by the microprocessor 216 connected to control ports 273 and 233 of the analogue electronic switch 207 and the CML electronic switch 203.

The facsimile machine 287, which incorporates the detection device, includes the bandpass filter 291 centred on the frequency 1100 Hz. In this embodiment, this is the filter marketed under the reference AFM94F1100E1 by MURATA MFG CO, LTD located in Japan. The detection frequency is 1100 Hz. The detection and non-detection levels are respectively −46 dBm and −49 dBm. The detection frequency range is [1050 Hz, 1150 Hz], which means that the range of frequencies between 1062 and 1138 Hz is detected in accordance with the above-mentioned UIT-T standard. Furthermore, the bandpass filter 291 does not discriminate any frequency below 1000 Hz nor above 1200 Hz.

According to the invention, the discrimination means, here composed of the bandpass filter 291, are connected to sampling means, composed in the case in point by the microprocessor 216 and a clock 224. Said clock 224 enables a timing to be given to the microprocessor 216 so that it samples, at regular intervals (here every 10 ms), the level of the signal leaving the bandpass filter 291.

The calculation means 216 are here adapted to send a signal representing the detection of a call by a facsimile machine. After the detection of the "CNG" signal, the calculation means know the nature of the system which is sending the call, a facsimile machine. They then control the changeover of the relay 203 into position 232 in order to disconnect the external answering machine and to make the device shown follow a facsimile machine procedure. Where the "CNG" signal is not detected, the calculation means know that the system which is sending the call is not a facsimile machine, and the relay 203 is in position 231 in order to connect the external answering machine with the telecommunication line and to enable the recording of a message.

Of course, the present invention is in no way limited to the embodiments described with the help of the figures but on the contrary it encompasses any variant within the capability of the expert.

In particular the device described with reference to FIGS. 4 and 5A, 5B and 5C may use all the general and particular embodiments of the method described with reference to FIGS. 3A to 3E.

In particular, the signal presence decision may be taken according to any other respective position of the values SR, Sabs, and Spre, and possibly according to an additional factor resulting from the analysis of all or part of the set of signals sampled.

In particular, the invention does not apply solely to the line busy signal but more generally to all signals on which the tolerances on the ON and OFF durations are small compared with these ON and OFF durations (for example the so-called "ringing tone" signal).

It should also be stated that, although the above description concerns the detection of the presence of a periodic signal, the frequency of which is the main characteristic, the invention applies just as easily, with adaptations within the capability of the expert, to the detection of signals of which it is the amplitude, the phase, or more generally any information modulating a physical magnitude which is characteristic in the set of signals.

We claim:

1. A method for detecting the presence of a periodic signal corresponding to a state of a communication process from amongst a set of signals, said periodic signal having a period of occurrence T during at least a predetermined duration $T_{ON}$, the method comprising:

a) a discrimination step during which said periodic signal is discriminated from the set of signals and an output signal is delivered, the level of the output signal being representative of the result of the discrimination of said periodic signal in said set of signals, b) a sampling step during which the level obtained in said discrimination step is sampled in ln samples over a duration greater than one repetition period T;

c) a correlation step during which there is made correspondence for the samples obtained in said sampling step for each sample of ranking i varying from 1 to ln, of a state value B(i) representative of a level of each sample, and, over at least a first part of the sampling duration, a true correlation value SR is calculated, by cumulating, for each pair of samples of ranking i and i+Z, the instantaneous value of correlation between the state value B(i) and the state value B(i+Z), the samples of ranking i and i+Z being located at instants shifted by a period T, Z being the number of samples taken during a period T of the signal to be detected, d) a rate calculation step during which the rate r of samples representative of the presence of said periodic signal is measured over at least a second part of the sampling duration, this rate r being the ratio of the number of samples for which level is representative of the presence of the signal to be detected, over the total number of samples in the second part of the sampling duration, e) a theoretical evaluation step during which the determination of at least one theoretical correlation average value is carried out, and f) a decision step during which the true correlation value SR is compared with each theoretical correlation average value and the presence or absence of the periodic signal to be detected, and the corresponding state of the communication process, is deduced according to the result of this comparison.

2. A method according to claim 1, wherein, in said sampling step, the level obtained is sampled in ln samples over a duration equal to a multiple of the repetition period T, the multiplication factor being greater than or equal to 2.

3. A method according to claim 1 or 2, wherein the signal to be detected is a periodic signal, of constant frequency, amplitude and phase, having a period of occurrence T during at least a predetermined duration $T_{ON}$, and wherein, in said discrimination step, the frequency of said periodic signal to be detected is discriminated in the set of signals and an output signal is delivered, the output signal having two levels representing respectively the presence or the absence of said constant frequency in said set of signals.

4. A method according to claim 1 or 2, wherein the calculation of the true correlation value SR used in said decision step is carried out by cumulating the product B(i).B(i+Z) of the pairs of state values in accordance with the following formula:

$$SR = \sum_{i=1}^{i=\ln-Z} B(i) \cdot B(i+Z)$$

in which Z is the number of samples taken during a period T.

5. A method according to claim 1 or 2, wherein the first theoretical correlation average value Sabs is determined according to the rate r.

6. A method according to claim 5, wherein the first theoretical correlation average value Sabs is determined as being the correlation average value of a sampled signal having a rate of samples representing the presence of said periodic signal to be detected equal to the rate r, assuming the absence of the signal to be detected in said set of signals.

7. A method according to claim 6, wherein the calculation of the theoretical correlation average value Sabs is carried out in accordance with the following formula:

$$Sabs=(ln-Z)(1-2r)^2$$

where Z is the number of samples during a period T.

8. A method according to claim 1 or 2, wherein during the theoretical evaluation step, the determination of a second theoretical correlation average value Spre is carried out and wherein, during the decision step, the true correlation value SR is compared with the two theoretical correlation average values Sabs and Spre and the presence or absence of the signal to be detected is deduced according to the result of these comparisons.

9. A method according to claim 8, wherein the second theoretical correlation average value Spre is determined according to the rate r.

10. A method according to claim 9, wherein the second theoretical correlation average value Spre is determined as being the correlation average value of a sampled signal having a rate of samples representing the presence of said periodic signal to be detected equal to the rate r, assuming the presence of the signal to be detected.

11. A method according to claim 10, wherein the calculation of said theoretical correlation average value Spre is carried out in accordance with the following formula:

$$Spre=(ln-Z)[1-4*r+4/\text{OFF}(\text{ON}*s^2+Z*r^2-2*\text{ON}*r*s)]$$

where:
- s is a probability of detecting the samples delivered during the duration $T_{ON}$ of the periodic signal,
- ON is a number of samples during a duration $T_{ON}$, and
- OFF is a number of samples during a duration $T_{OFF}$ of silence between two $T_{ON}$ durations.

12. A method according to claim 8, wherein, in said decision step, it is decided that the signal to be detected is present only when the true correlation value SR is greater than a threshold value which is intermediate between the second theoretical correlation average Spre and the first theoretical correlation average Sabs.

13. A method according to claim 1 or 2, wherein, in said decision step, it is decided that the signal to be detected is present only when the rate r of samples representing the presence of said periodic signal to be detected is greater than a predetermined value Threshold.

14. A method according to claim 1 or 2, wherein the signal to be detected is a busy signal sent on a telephone line and wherein said set of signals is composed at least partly of a plurality of signals sent by a telephone answering machine.

15. A method according to claim 1 or 2, wherein the signal to be detected is a signal identifying a facsimile machine sending over a telephone line and wherein said set of signals is composed at least partly of a plurality of signals sent by a facsimile machine.

16. A method for detecting the presence of a periodic signal corresponding to a state of a communication process from amongst a set of signals, said periodic signal having a period of occurrence T during at least a predetermined duration $T_{ON}$, the method comprising:

a) a discrimination step during which said periodic signal is discriminated from the set of signals and an output signal is delivered, the level of the output signal being representative of the result of the discrimination of said periodic signal in said set of signals, b) a sampling step during which the level obtained in said discrimination step is sampled in ln samples over a duration greater than one repetition period T, c) a correlation step during which there is made correspondence for the samples obtained in said sampling step for each sample of ranking i varying from 1 to ln, of a state value B(i) representative of a level of each sample, and, over at least a first part of the sampling duration, a true correlation value SR is calculated, by cumulating, for each pair of samples of ranking i and i+Z, the instantaneous value of correlation between the state value B(i) and the state value B(i+Z), the samples of ranking i and i+Z being located at instants shifted by a period T, Z being the number of samples taken during a period T of the signal to be detected, d) a rate calculation step during which the rate r of samples representative of the presence of said periodic signal is measured over at least a second part of the sampling duration, this rate r being the ratio of the number of samples for which level is representative of the presence of the signal to be detected, over the total number of samples in the second part of the sampling duration, e) a theoretical evaluation step during which the determination of at least one theoretical correlation average value is carried out, and f) a decision step during which the true correlation value SR is compared with each theoretical correlation average value and the presence or absence of the periodic signal to be detected, and the corresponding state of the communication process, is deduced according to the result of this comparison, wherein the signal to be detected is a busy signal sent on a telephone line and wherein said set of signals is composed at least partly of a plurality of signals sent by a telephone answering machine, and wherein the method further comprises the step of switching between a line release mode if the presence of the busy signal is detected, and a telephone communication continuation mode in the contrary case.

17. A method according to claim 16, wherein, in said sampling step, the level obtained is sampled in ln samples over a duration equal to a multiple of the repetition period T, the multiplication factor being greater than or equal to 2.

18. A method for detecting the presence of a periodic signal corresponding to a state of a communication process from amongst a set of signals, said periodic signal having a period of occurrence T during at least a predetermined duration $T_{On}$, the method comprising:

a) a discrimination step during which said periodic signal is discriminated from the set of signals and an output signal is delivered, the level of the output signal being representative of the result of the discrimination of said periodic signal in said set of signals, b) a sampling step during which the level obtained in said discrimination step is sampled in ln samples over a duration greater than one repetition period T, c) a correlation step during which there is made correspondence for the samples obtained in said sampling step for each sample of ranking i varying from 1 to ln, of a state value B(i) representative of a level of each sample, and, over at least a first part of the sampling duration, a true correlation value SR is calculated, by cumulating, for each pair of samples of ranking i and i+Z, the instantaneous value of correlation between the state value B(i) and the state value B(i+Z), the samples of ranking i and i+Z being located at instants shifted by a period T, Z being the number of samples taken during a period T of the signal to be detected, d) a rate calculation step during which the rate r of samples representative of the presence of said periodic signal is measured over at least a second part of the sampling duration, this rate r being the ratio of the number of samples for which level is representative of the presence of the signal to be detected, over the total number of samples in the second part of the sampling duration, e) a theoretical evaluation step during which the determination of at least one theoretical correlation average value is carried out, and f) a decision step during which the true correlation value SR is compared with each theoretical correlation average value and the presence or absence of the periodic signal to be detected, and the corresponding state of the communication process, is deduced according to the result of this comparison, wherein the signal to be detected is a signal identifying a facsimile machine sending over a telephone line and said set of signals is composed at least partly of a plurality of signals sent by a facsimile machine, and wherein the method further comprises the step of switching between a facsimile mode if the presence of the signal identifying a facsimile machine is detected, and a telephone communication continuation mode in the contrary case.

19. A method according to claim 18, wherein, in said sampling step, the level obtained is sampled in ln samples over a duration equal to a multiple of the repetition period T, the multiplication factor being greater than or equal to 2.

20. A device for detecting the presence of a periodic signal corresponding to a state of a communication process from amongst a set of signals, said periodic signal having a period of occurrence T during at least a predetermined duration $T_{ON}$, said device comprising:

discrimination means which selects said periodic signal in the set of said signals and delivers an output signal, the level of the output signal being representative of the discrimination of said periodic signal in said set of signals;

sampling means adapted to sample the level obtained by said discrimination means in ln samples over a duration greater than one repetition period T; and processing means including calculation and storage means adapted to cause to correspond, for the samples obtained by said sampling means, to each sample of ranking i varying from 1 to ln, a state value B(i) representative of a level of each sample, and to calculate, over at least a first part of the sampling duration, a true correlation value SR, by cumulating, for each pair of samples of ranking i and i+Z, the instantaneous value of correlation between the state value B(i) and a state value B(i+Z), the samples of ranking i and i+Z being located at instants shifted by a period T, Z being the number of samples taken during a period T of the signal to be detected, to measure over at least a second part of the sampling duration the rate r of samples representative of the presence of said periodic signal to be detected, this rate r being the ratio of the number of samples for which level is representative of the presence of said periodic signal to be detected over the total number of samples of said second part of the sampling duration, to determine at least one first theoretical correlation average value Sabs, and to compare the true correlation value SR with each theoretical average correlation value and deduce the presence or absence of said periodic signal to be detected, and the corresponding state of the communication process, according to the result of this comparison.

21. A device according to claim 20, wherein the sampling means are adapted to sample the level obtained in ln samples over a duration equal to a multiple of the repetition period T, the multiplication factor being greater than or equal to 2.

22. A device according to claim 20 or 21, wherein said periodic signal to be detected is a periodic signal, of constant frequency, amplitude and phase, having a period of occurrence T during at least a predetermined duration $T_{ON}$, and wherein the discrimination means filters said frequency in the set of said signals and delivers an output signal, the output signal having two levels representing respectively the presence or absence of said frequency in said set of signals.

23. A device according to claim 20 or 21, wherein said calculation means perform the calculation of said true correlation value SR by cumulating the—product B(i).B(i+Z) of pairs of state values in accordance with the following formula:

$$SR = \sum_{i=1}^{i=\ln-z} B(i) \cdot B(i+Z)$$

in which Z is the number of samples taken during a period T.

24. A device according to claim 20 or 21, wherein the calculation means determine the first theoretical correlation average value Sabs as a function of the rate r.

25. A device according to claim 24, wherein the calculation means determine the first theoretical correlation average value Sabs as being the correlation average value of a sampled signal having a rate of samples representing the presence of said periodic signal to be detected equal to the rate r, assuming the absence of the signal to be detected in said set of signals.

26. A device according to claim 25, wherein the calculation means perform the calculation of the theoretical correlation average value Sabs in accordance with the following formula:

$$Sabs = (ln-Z)(1-2r)^2$$

where Z is the number of samples during a period T.

27. A device according to claim 20 or 21, wherein the calculation means determine a second theoretical correlation average value Spre and compare the true correlation value SR with the two theoretical average correlation values Sabs and Spre and deduce the presence or absence of the signal to be detected according to the result of these comparisons.

28. A device according to claim 27, wherein the calculation means determine the second theoretical correlation average value Spre according to the rate r.

29. A device according to claim 28, wherein the calculation means determine the second theoretical correlation average value Spre as being the correlation average value of a sampled signal having a rate of samples representing the presence of said periodic signal to be detected equal to the rate r, assuming the presence of the signal to be detected.

30. A device according to claim 29, wherein the calculation means perform the calculation of said theoretical correlation average value Spre in accordance with the following formula:

$$Spre=(ln-Z)\,[1-4*r+4/\text{OFF}\,(\text{ON}*s^2+Z*r^2-2*\text{ON}*r*s)]$$

where:
- s is a probability of detecting the samples delivered during the duration $T_{ON}$ of the periodic signal,
- ON is a number of samples during a duration $T_{ON}$
- OFF is a number of samples during a duration $T_{OFF}$ of "silence" between two $T_{ON}$ durations.

31. A device according to claim 27, wherein the calculation means conclude that the signal to be detected is present only when the true correlation value SR is closer to the second theoretical correlation average Spre than to the first theoretical correlation average Sabs.

32. A device according to claim 20 or 21, wherein the calculation means conclude that the signal to be detected is present only when the rate r of samples representing the presence of said periodic signal to be detected is greater than a predetermined value Threshold.

33. A device according to claim 20 or 21, wherein the discrimination means is composed of a modulator/demodulator.

34. A device according to claim 20 or 21, wherein the signal to be detected has a characteristic frequency and wherein the discrimination means is composed of a band-pass filter centered on said frequency of the signal to be detected, said filter being associated with an analogue-to-digital converter.

35. A device according to claim 20 or 21, wherein the signal to be detected is a busy signal sent on a telephone line and wherein said set of signals is composed at least partly of a plurality of signals sent by a telephone answering machine.

36. A device according to claim 20 or 21, wherein the signal to be detected is a signal identifying a facsimile machine sending over a telephone line and wherein said set of signals is composed at least partly of a plurality of signals sent by a facsimile machine.

37. A device according to claim 20 or 21, further comprising a facsimile system.

38. A device according to claim 37, further comprising a built-in answering machine.

39. A device according to claim 20 or 21, further comprising a telephone answering system.

40. A device for detecting the presence of a periodic signal corresponding to a state of a communication process from amongst a set of signals, said periodic signal having a period of occurrence T during at least a predetermined duration $T_{ON}$, said device comprising:

discrimination means which selects said periodic signal in the set of said signals and delivers an output signal, the level of the output signal being representative of the discrimination of said periodic signal in said set of signals;

sampling means adapted to sample the level obtained by said discrimination means in ln samples over a duration greater than one repetition period T; and processing means including calculation and storage means adapted to cause to correspond, for the samples obtained by said sampling means, to each sample of ranking i varying from 1 to ln, a state value B(i) representative of a level of each sample, and to calculate, over at least a first part of the sampling duration, a true correlation value SR, by cumulating, for each pair of samples of ranking i and i+Z, the instantaneous value of correlation between the state value B(i) and a state value B(i+Z), the samples of ranking i and i+Z being located at instants shifted by a period T, Z being the number of samples taken during a period T of the signal to be detected, to measure over at least a second part of the sampling duration the rate r of samples representative of the presence of said periodic signal to be detected, this rate r being the ratio of the number of samples for which level is representative of the presence of said periodic signal to be detected over the total number of samples of said second part of the sampling duration, to determine at least one first theoretical correlation average value Sabs, and to compare the true correlation value SR with each theoretical average correlation value and deduce the presence or absence of said periodic signal to be detected, and the corresponding state of the communication process, according to the result of this comparison, wherein the signal to be detected is a busy signal sent on a telephone line and said set of signals is composed at least partly of a plurality of signals sent by a telephone answering machine, and wherein the device further comprises means for switching a communications assembly incorporating telephone and facsimile functions, permanently adapted to switch the operation of the device between a line release mode if the presence of the busy signal is detected, and a telephone communication continuation mode in the contrary case.

41. A device according to claim 40, wherein the sampling means are adapted to sample the level obtained in ln samples over a duration equal to a multiple of the repetition period T, the multiplication factor being greater than or equal to 2.

42. A device for detecting the presence of a periodic signal corresponding to a state of a communication process from amongst a set of signals, said periodic signal having a period of occurrence T during at least a predetermined duration $T_{ON}$, said device comprising:

discrimination means which selects said periodic signal in the set of said signals and delivers an output signal, the level of the output signal being representative of the discrimination of said periodic signal in said set of signals;

sampling means adapted to sample the level obtained by said discrimination means in ln samples over a duration greater than one repetition period T; and processing means including calculation and storage means adapted to cause to correspond, for the samples obtained by said sampling means, to each sample of ranking i varying from 1 to ln, a state value B(i) representative of a level of each sample, and to calculate, over at least a first part of the sampling duration, a true correlation value SR, by cumulating, for each pair of samples of ranking i and i+Z, the instantaneous value of correlation between the state value B(i) and a state value B(i+Z), the samples of ranking i and i+Z being located at instants shifted by a period T, Z being the number of samples taken during a period T of the signal to be detected, to measure over at least a second part of the sampling duration the rate r of samples representative of the presence of said periodic signal to be detected, this rate r being the ratio of the number of samples for which level is representative of the presence of said periodic signal to be detected over the total number of samples of said second part of the sampling duration, to determine at least one first theoretical correlation average value Sabs, and to compare the true correlation value SR with each theoretical average correlation value and deduce the presence or absence of said periodic signal to be detected, and the corresponding state of the communication process, according to the result of this comparison, wherein the signal to be detected is a signal identifying a facsimile machine sending over a telephone line and said set of signals is composed at least partly of a plurality of signals sent by a facsimile machine, and wherein the device further comprises means for switching a communications assembly incorporating telephone and facsimile functions, permanently adapted to switch the operation of the device between a facsimile mode if the presence of the signal identifying a facsimile machine is detected, and a telephone communication continuation mode in the contrary case.

43. A device according to claim 42, wherein the sampling means are adapted to sample the level obtained in ln samples over a duration equal to a multiple of the repetition period T, the multiplication factor being greater than or equal to 2.

* * * * *

UNITED STATES PATENT AND TRADEMARK OFFICE
CERTIFICATE OF CORRECTION

PATENT NO. : 6,028,927
DATED : February 22, 2000
INVENTOR(S) : Francois Delumeau, et al.

It is certified that error appears in the above-identified patent and that said Letters Patent is hereby corrected as shown below:

TITLE PAGE AT ITEM [57]:

ABSTRACT: "The present invention proposes a method and a device for detecting, amongst a set of signals, the presence of a periodic signal of period of occurrence T, in which a signal discriminating the said signal in the said set of signals is delivered. According to the invention, the discrimination signal is sampled 1n in samples over more than one period T, a state value B(i) representing its level, and a true correlation value SR is calculated, by cumulating, for pairs of samples I and I+z, the instantaneous value of correlation between the state value B(i) representing its level, and a true correlation value SR is calculated, by cumulating, for pairs of samples I and i+z, the instantaneous value of correlation between the state value B(i) and the state value (B (I+Z), the samples I and I+Z being located at instants shifted by a period T. Then for said pairs od samples, the rate r of samples having the said signal over the total number of samples having the said signal over the total number of samples is measured, at least one so-called "theoretical correlation average" value is determined, and the true correlation value SR is compared with each theoretical correlation average value and from this the presence or absence of the signal to be detected is deduced" should read
-- In an arrangement for detecting, amongst a set of signals, the presence of a periodic signal of period of occurrence T, a signal that discrimnates the periodic signal in the set of signals is produced. The discrimination signal is sampled in 1n samples over more than one period T. A state value B(i) representing its level, and a true correlation value SR are calculated by accumulating for pairs of samples i and i+Z, the instantaneous value of correlation between the state value B (i) and the state value B (i+Z). The samples i and i+Z are located at instants shifted by a period T. For the pair of signals, the rate r of samples having the signal over the total number of samples is measured. At least one so-called "theoretical correlation average" value is determined and the true correlation average value to deduce the presence or absence of the period signal. --

Column 6:
Line 24, "in" should read -- In --;
Life 46, "$f_2$," should read -- $f_2$; -- and
Line 54, "spondance" should read -- spondence --.

Column 9:
Line 33, "+OFF/Z $(1-2r')^{2]}$" should read -- +OFF/Z $(1-2r')^2]$ --.

UNITED STATES PATENT AND TRADEMARK OFFICE
CERTIFICATE OF CORRECTION

PATENT NO.  : 6,028,927
DATED       : February 22, 2000
INVENTOR(S) : Francois Delumeau, et al.

It is certified that error appears in the above-identified patent and that said Letters Patent is hereby corrected as shown below:

Column 12:
Line 10, "SC" should read -- 5C --; and
Formula: " (-1) $_{A(i)}$" should read -- (-1) $^{A(i)}$ --.

Column 13:
Line 62, "25" should be deleted; and
Line 67, "30" should be deleted.

Column 14:
Line 58, "As the" should read -- The --.

Column 20:
Line 17, "du" should read -- du- --; and
Line 41, "the-product" should read -- the product --.

Signed and Sealed this

Fourteenth Day of August, 2001

*Attest:*

*Attesting Officer*

NICHOLAS P. GODICI
*Acting Director of the United States Patent and Trademark Office*